Figure 1:
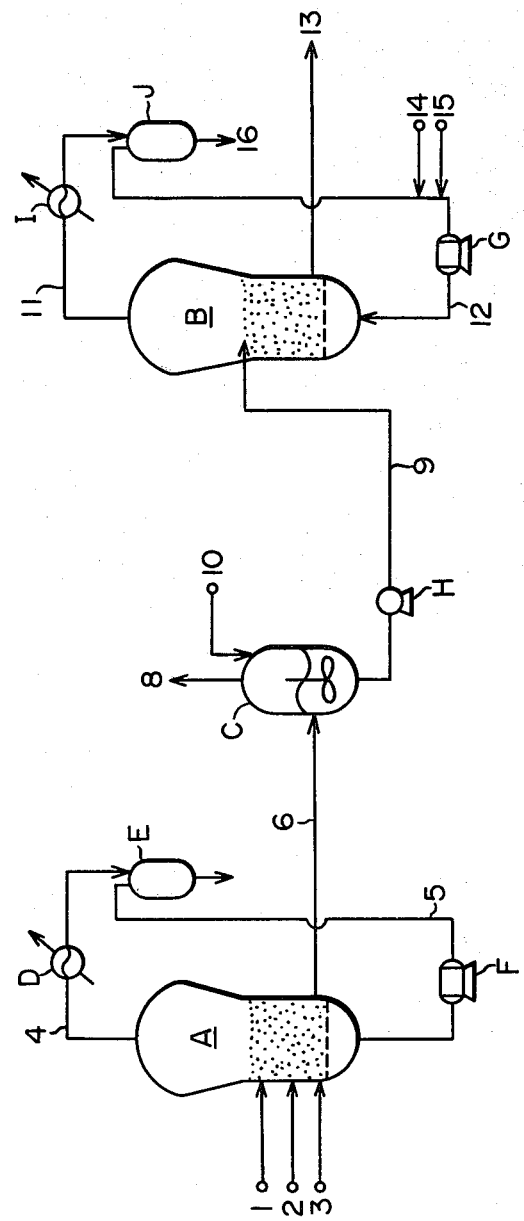

United States Patent [19]

Morita et al.

[11] 4,390,669
[45] * Jun. 28, 1983

[54] PROCESS FOR MULTI-STEP GAS-PHASE POLYMERIZATION OF OLEFINS

[75] Inventors: Yoshinori Morita; Shinzi Hayata, both of Iwakuni; Akifumi Kato, Ohtake; Hideo Nara, Ohtake; Tohru Watanabe, Ohtake, all of Japan

[73] Assignee: Mitsui Petrochemical Industries, Ltd., Tokyo, Japan

[*] Notice: The portion of the term of this patent subsequent to Jul. 6, 1999, has been disclaimed.

[21] Appl. No.: 266,593

[22] Filed: May 22, 1981

[30] Foreign Application Priority Data

May 27, 1980 [JP] Japan .................................. 55/69557

[51] Int. Cl.³ .......................... C08F 2/34; C08F 10/00
[52] U.S. Cl. ...................................... 526/65; 526/88; 526/125; 526/901
[58] Field of Search .................... 526/65, 88, 901, 905

[56] References Cited

U.S. PATENT DOCUMENTS

| | | | |
|---|---|---|---|
| 3,254,070 | 5/1966 | Roelen | 526/65 |
| 3,592,880 | 7/1971 | Diedrick et al. | 526/65 |
| 4,012,573 | 3/1977 | Trieschmann et al. | 526/88 |
| 4,048,412 | 9/1977 | Caumartin et al. | 526/125 |
| 4,098,974 | 7/1978 | Klaassen | 526/65 |
| 4,269,948 | 5/1981 | Nicco | 525/53 |
| 4,291,132 | 9/1981 | Clifford | 526/65 |

*Primary Examiner*—Edward J. Smith
*Attorney, Agent, or Firm*—Sherman & Shalloway

[57] ABSTRACT

In a process for polymerizing olefins in the gaseous phase in a first gas-phase polymerization zone and a second gas-phase polymerization zone, which are provided independently from each other, in the presence of a catalyst composed of a transition metal catalyst component and an organometallic compound of a metal of Groups I to III of the periodic table while feeding the catalyst-containing polymer formed in the first zone to the second zone; the improvement wherein (i) a suspension zone for forming a suspension of the polymer from the first zone in an easily volatile hydrocarbon medium which is liquid under the conditions of feeding the polymer is provided in a feed passage for feeding the polymer from the first zone to the second zone, and (ii) the suspension of the polymer in said liquid medium formed in the suspension zone is fed to the second zone.

10 Claims, 1 Drawing Figure

PROCESS FOR MULTI-STEP GAS-PHASE POLYMERIZATION OF OLEFINS

This invention relates to an improvement in a process for multi-step gas-phase polymerization of olefins, in which olefins are polymerized in the gaseous phase in at least two independent gas-phase polymerization zones advantageously both in regard to operation and apparatus while feeding a catalyst-containing polymer formed in a first polymerization zone to a second polymerization zone. In particular, it relates to an improved multi-step gas-phase polymerization process which is suitable for easily adjusting the molecular weight distribution and/or chemical composition distribution of the final olefin polymer composition to desired values by producing olefin polymers having different molecular weights and/or chemical compositions in two gas-phase polymerization zones.

In the present application, the term "polymerization" denotes not only homo-polymerization but also co-polymerization, and the term "polymer" denotes not only a homopolymer but also a copolymer.

Improvements of transition metal catalyst components for olefin polymerization have made it possible to produce olefin polymers in an amount of at least about 5000 g per millimole of transition metal, and at the present level of technology, the operation of removing catalyst after polymerization can be omitted. When such a highly active catalyst is used, a gaseous-phase process for polymerizing olefins is attracting attention because the operation after polymerization is simplest.

Olefin polymers are molded into articles by various methods, and the molded articles are used in many fields. It is important therefore to provide olefin polymers having various desired molecular weight distributions and/or chemical composition distributions depending upon the method of molding and the intended use of the molded article. The molecular weight distribution, etc. can be adjusted by varying the type, composition and amount of the polymerization catalyst or the polymerization conditions. In a process in which polymerization is carried out only in one polymerization zone, there is a limit in an area in which the molecular weight distribution, etc. can be adjusted. In order to eliminate such a limitation, there is known a process which comprises polymerizing olefins in the gaseous phase in the presence of a catalyst composed of a transition metal component and an organometallic compound of a metal of Groups I to III of the periodic table in a first gas-phase polymerization zone and a second gas-phase polymerization zone, which are provided independently from each other, while feeding a catalyst-containing polymer formed in the first zone to the second zone, wherein polymers having different molecular weights are formed in the individual zones so as to adjust the molecular weight distribution, etc. of the resulting polymer composition (Japanese Laid-Open Patent Publication No. 145589/1976 corresponding to U.S. Pat. No. 4,048,412).

In actual practice, however, such a multi-step gas-phase polymerization method suffers from a trouble which makes it difficult to adjust the molecular weight distribution and/or chemical composition distribution of the resulting olefin polymer composition to the desired values. For example, to obtain the desired molecular weight, it is usual to perform the polymerization in the presence of a molecular weight controlling agent such as hydrogen gas introduced into the polymerization zone. It has been found however that when the multi-step gas-phase polymerization process is carried out while adjusting the molecular weight by such a molecular weight controlling agent to a new technical problem to be solved arises which does not exist in solution polymerization or suspension polymerization.

For example, a polymerization process comprising forming a polymer of a relatively low molecular weight in a first zone and a polymer of a relatively high molecular weight in a second zone, which is industrially advantageous in operating the individual steps at nearly the same polymerization pressure and obtaining olefin polymers having different molecular weights in the individual steps, suffers from troubles associated with the operation and apparatus of gaseous-phase polymerization.

One of such troubles is as follows: The polymer-containing product flow from the first polymerization zone in which a polymer having a relatively low molecular weight is produced contains hydrogen in an amount considerably larger than that of hydrogen required as a molecular weight controlling agent in the second gas-phase polymerization in which a polymer of a relatively high molecular weight is to be produced. Accordingly, when the polymer-containing product flow from the first polymerization zone is directly fed to the second polymerization zone so as to produce a polymer of a higher molecular weight therein, it is necessary to reduce the ratio of hydrogen to olefin, and accordingly, it is necessary to supply additionally an exceedingly large amount of olefin to the second polymerization zone. Consequently, it is necessary to increase the scale of the second gas-phase polymerization zone to the one which is disadvantageous to operation and apparatus, or the polymerization pressure of the second gas-phase polymerization zone must be made considerably higher than that in the first polymerization zone. This increases the cost and is disadvantageous to operation and apparatus. Particularly, in the latter case, it is technically difficult to feed the catalyst-containing product flow formed in the first zone to the second zone maintained at a higher pressure.

The present invention made extensive investigations in order to achieve an improvement in a multi-step gas-phase polymerization process, which gives a solution to the aforesaid technical problems and permits advantageous performance of multi-step gas-phase polymerization of olefins both in operation and apparatus over conventional gas-phase polymerization processes.

These investigations have led to the discovery that the aforesaid technical problems can be solved and a further improved process for multi-step gas-phase polymerization of olefins can be provided by (i) providing a suspension zone for forming a suspension of the catalyst-containing polymer in an easily volatile hydrocarbon medium which is liquid under the conditions of feeding the aforesaid polymer in a feed passage for feeding the catalyst-containing polymer formed in the first zone to the second gas-phase polymerization zone, and (ii) feeding the aforesaid suspension of the polymer in the liquid hydrocarbon medium formed in the suspension zone to the second gas-phase polymerization zone. It has also been found that by operating as mentioned above, the solid-gas composition discharged from the first gas-phase polymerization zone can be changed to the desired composition by a gas-liquid contacting treatment in the suspension zone. For example, a gaseous portion containing a large amount of hydrogen can be easily separated from a solid portion containing the polymer. The separated gaseous phase can be advantageously recycled directly to the first gas-phase polymerization zone. Furthermore, since the separated polymer phase can be fed to the second gas-phase polymerization zone which contains a reduced amount of hydrogen and is suspended in an easily volatile hydrocarbon, a polymer of a higher molecular weight can be produced in the second gas-phase polymerization zone easily by an easy operation in an advantageous apparatus without the need to increase the scale of the second polymerization zone excessively. Moreover, the heat of polymerization can be advantageously removed by the vaporization of the easily volatile hydrocarbon.

It has further been found that even when the polymerization pressure of the second gas-phase polymerization zone is made higher than that of the first gas-phase polymerization zone, the polymer flow can be easily fed from the first zone to the second zone by using a feed pump, etc. since the polymer flow discharged from the first zone is supplied to the second zone after it is suspended in a liquid easily-volatile hydrocarbon. Thus, the polymerization pressures in the first and second zones can be controlled independently. Hence, no trouble occurs in making the melt index (M.I.) of the olefin polymer produced in the first zone higher than the olefin polymer produced in the second zone (making the partial pressure of $H_2$ in the first pressure higher than that in the second zone), and no difficulty arises in making the melt index of the olefin polymer produced in the first zone lower than that of the polymer produced in the second zone (making the partial pressure of $H_2$ in the first zone lower than that in the second zone). Consequently, the operation of the gas-phase multi-step polymerization of olefins and the properties of the resulting olefin polymer can be controlled within the desired ranges, and process of this invention is free from the various restrictions of the prior art processes.

It is an object of this invention therefore to provide a markedly improved process for gas-phase multi-step polymerization of olefins which can overcome the various disadvantages in the prior art gas-phase multi-step polymerization of olefins.

The above and other objects and advantages of the invention will become apparent from the following description.

According to this invention, there is provided, in a process for polymerizing olefins in the gaseous phase in a first gas-phase polymerization zone and a second gas-phase polymerization zone, which are provided independently from each other, in the presence of a catalyst composed of a transition metal catalyst component and an organometallic compound of a metal of Groups I to III of the periodic table while feeding the catalyst-containing polymer formed in the first zone to the second zone; the improvement wherein (i) a suspension zone for forming a suspension of the polymer from the first zone in an easily-volatile hydrocarbon medium which is liquid under the conditions of feeding the polymer is provided in a feed passage for feeding the polymer from the first zone to the second zone, and (ii) the suspension of the polymer in said liquid medium formed in the suspension zone is fed to the second zone.

Needless to say, in the practice of the process of this invention, an optional step of polymerizing an olefin may be performed before the gas-phase polymerization in the first zone and/or after the gas-phase polymerization in the second zone. If desired, the aforesaid suspension zone may also be provided in such an additional step.

The process of this invention can be conveniently utilized in the polymerization of olefins using a transition metal catalyst, particularly a catalyst composed of a highly active transition metal component and an organometallic compound of a metal of Groups I to III of the periodic table. Preferably, the process of this invention is applied to the polymerization of olefins using a highly active catalyst capable of producing at least about 5,000 g, preferably at least about 8,000 g, of olefin polymer per millimole of transition metal under the polymerization conditions in the first step gas-phase polymerization zone.

The transition metal component used as a catalyst component in the process of this invention is a compound of a transition metal such as titanium, vanadium, chromium and zirconium which may be liquid or solid under conditions of use. This component needs not to be a single compound, but may be supported on, or mixed with, another compound, or a complex with another compound. Suitable is a highly active transition metal component capable of producing at least about 5,000 g, preferably at least about 8,000 g, of an olefin polymer per millimole of transition metal. A typical example is a highly active titanium catalyst component activated with a magnesium compound.

Preferred are highly active transition metal catalyst components consisting essentially of titanium, magnesium and halogen. An example is a solid titanium catalyst component consisting of titanium, magnesium and halogen as essential ingredients and containing amorphous magnesium halide and having a specific surface area of preferably at least about 40 m$^2$/g, especially preferably from about 80 m$^2$/g to about 800 m$^2$/g. Such components may contain an electron donor such as an organic acid ester, a silicic acid ester, an acid halide, an acid anhydride, a ketone, an acid amide, a tertiary amine, an inorganic acid ester, a phosphoric ester, a phosphorous ester or an ether. Advantageously, such components contain about 0.5 to about 15% by weight, preferably about 1 to about 8% by weight, of titanium, and have a titanium/magnesium atomic ratio of from about $\frac{1}{2}$ to about 1/100, especially from about $\frac{1}{3}$ to about 1/50, a halogen/titanium atomic ratio of from about 4 to about 100, preferably from about 6 to from about 80, and an electron donor/titanium mole ratio of from 0 to about 10, preferably from 0 to about 6. A number of such catalyst components have been suggested and widely known.

The organometallic compound, the other component constituting the catalyst, is an organometallic compound containing a metal of Groups I to III of the periodic table bonded to a carbon, for example organic alkali metal compounds, organic alkaline earth metal compounds, and organoaluminum compounds. Specific examples include alkyllithiums, arylsodiums, alkylmagnesiums, arylmagnesiums, alkylmagnesium halides, arylmagnesium halides, alkylmagnesium hydrides, trialkylaluminums, dialkylaluminum monohalides, alkylaluminum sesquihalides, alkylaluminum dihalides, alkylaluminum hydrides, alkylaluminum alkoxides, alkyllithium aluminums, and mixtures thereof.

In addition to the above two catalyst components, there may also be used an electron donor component such as an organic acid ester, a silicic acid ester, a carboxylic acid halide, a carboxylic acid amide, a tertiary amine, an acid anhydride, an ether, a ketone, an aldehyde or a halogenated hydrocarbon in order to adjust the stereoregularity, molecular weight, molecular weight distribution, etc. of the polymer. The electron donor catalyst component may be used after forming a complex compound (or an adduct) with the organometallic compound, or with another compound, for example a Lewis acid such as aluminum trihalides.

The process of this invention is applicable to the polymerization of polymerizable olefins having 2 to 12 carbon atoms. Specific examples include ethylene, propylene, 1-butene, 1-pentene, 1-hexene, 1-octene, 1-decene, 4-methyl-1-pentene, 3-methyl-1-pentene, styrene, butadiene, isoprene, 1,4-hexadiene, dicyclopentadiene, and 5-ethylidene-2-norbornene. One or more of these monomers may be chosen and homopolymerized or copolymerized in the gaseous phase.

In performing the process of this invention, it is not necessary to produce a polymer of the same composition in the first and second zones. The process of the invention is preferably applied to the homopolymerization of ethylene or propylene, copolymerization of ethylene and another olefin, and copolymerization of propylene and another olefin. In an especially preferred embodiment, the process of the invention is applied to the homopolymerization or copolymerization of ethylene in which the adjustment of molecular weight distribution is desired. The process is especially preferred when the multi-step gaseous-phase polymer is carried out in the presence of hydrogen in the first and second polymerization zones, and the mole ratio of hydrogen to olefin in the second zone is made lower than that in the first zone.

Gaseous-phase polymerization in each of the polymerization zones may be carried out using a fluidized bed reactor, a stirred bed reactor, a stirred fluidized bed reactor, a tubular reactor, etc. The reaction temperature in each of the polymerization zone is below the melting point of the olefin polymer, preferably at least about 10° C. lower than the melting point, and from room temperature to about 130° C., preferably from about 40° to about 110°. The polymerization pressure is, for example, from atmospheric pressure to about 150 kg/cm$^2$, preferably from about 2 to about 70 kg/cm$^2$. The polymerization may be carried out in the presence of a molecular weight controlling agent such as hydrogen. Hydrogen can be used, for example, in an amount of not more than about 20 moles per mole of the olefin. The reaction temperature and pressure may be different for the two polymerization zones. When the reaction pressure in the second polymerization zone is lower than that in the first zone, it is advantageous for feeding the polymer. But no special difficulty arises even when the pressure in the second zone is higher than that in the first zone.

In the process of this invention, the amount of the catalyst is preferably such that per liter of the volume of a polymerization fluidized bed of each gas-phase polymerization zone, the transition metal compound is used in an amount of about 0.0005 to about 1 millimoles, especially about 0.001 to about 0.5 millimoles, calculated as transition metal atom and the organometallic compound is used in an atomic ratio of the metal of the organometallic compound to the transition metal of from about 1 to about 2,000, preferably from about 1 to about 500. The electron donor component is preferably used in an amount of 0 to about 1 mole, particuly 0 to about 0.5 mole, per mole of the organometallic compound.

The olefin polymer discharged from the first gas-phase polymerization zone contains gaseous components. It is contacted in a suspending zone with an easily-volatile hydrocarbon which is liquid under the transporting conditions, thereby separating gas from liquid. Preferably, the easily-volatile hydrocarbon is a hydrocarbon which can be nearly completely gasified in the second gas-phase polymerization zone and is non-polymerizable. Suitable volatile hydrocarbons are saturated hydrocarbons having 3 to 5 carbon atoms, such as propane, n-butane, isobutane, n-pentane and isopentane. If desired, the olefin used for polymerization in the second gas-phase polymerization zone may be utilized as the easily-volatile hydrocarbon, and in this case, a liquid form of the olefin, or a liquid mixture of it with the aforesaid saturated hydrocarbon may be used.

The amount of the easily volatile hydrocarbon may be such that the polymer can be transported as a slurry. Too large an amount of the volatile hydrocarbon is not desirable. For example, the suitable amount of the liquid easily-volatile hydrocarbon is such that per liter of the liquid easily-volatile hydrocarbon, the polymer is used in an amount of about 10 to about 1000 g, particularly about 50 to about 600 g. The catalyst-containing polymer discharged from the first gas-phase polymerization zone together with gaseous components may be contacted with the liquid easily-volatile hydrocarbon in a suspending zone in the form of, for example, a vessel. The contacting temperature is, for example, 0° to about 100° C., and the pressure is, for example, from atmospheric pressure to about 50 kg/cm$^2$. The contact time (the time which elapses until the resulting suspension is fed into the second gas-phase polymerization zone) is, for example, about 10 seconds to about 5 hours. The gaseous portion of the catalyst-containing polymer flow from the first zone which was not dissolved by the liquid easily-volatile hydrocarbon by the above contact may be recycled to the first gas-phase polymerization zone after, for example, its pressure has been raised.

The polymer suspended in the easily volatile hydrocarbon is then fed into the second gas-phase polymerization zone where the easily-volatile hydrocarbon is gasified. If desired, a part or the whole of the easily-volatile hydrocarbon is preliminary gasified by flashing, etc. before the suspension is fed into the second gas-phase polymerization zone. A fresh supply of olefin, hydrogen, etc. may be added to the second gas-phase polymerization zone so as to provide the desired gas composition. The polymer discharged from the second gas-phase polymerization zone is subjected to solid-gas separation by means of a cyclone, etc., and dried to form a final product. Or it may be pelletized by an extruder, etc.

Thus, according to this invention, a polymer composition having a desired molecular weight distribution and/or a desired chemical composition distribution can be obtained continuously by the industrially advantageous gas-phase polymerization technique. The present invention can also provide an improved apparatus for multistep gas-phase polymerization of olefins, characterized in that a suspending zone for suspending the polymerization product in a liquid easily-volatile hydrocarbon is provided in a passage for feeding the polymerization product flow from a first gas-phase polymerization zone to a second gas-phase polymerization zone.

The following Examples and Comparative Examples illustrate the present invention in more detail.

Examples 1 to 4 and Comparative Examples 1 and 2

FIG. 1 of the accompanying drawing is a schematic flow diagram of a gas-phase two-step polymerization apparatus used in the practice of the process of this invention. In FIG. 1, A represents a first-step gas-phase polymerization vessel; B, a second-step gas-phase polymerization vessel; and C, a drum constituting a suspending zone for suspending polyethylene discharged from the first-step polymerization vessel A in an easily-volatile hydrocarbon.

D and I represent heat-exchangers for removing the heat of polymerization reaction, which are used for cooling gases circulated from the polymerization system. F and G represent blowers used for circulating reactant gases. E and J represent drums for receiving a condensed liquid (liquid hydrocarbon) which is formed by the cooling of the circulating gas. H represents a pump for feeding the suspension of polyethylene (PE) to the second-step gas-phase polymerization vessel B.

Using the above apparatus, polyethylene having a very broad molecular weight distribution was produced in the following manner by forming polyethylene having a high MI in the first-step polymerization vessel, and polyethylene having a low MI in the second-step polymerization vessel.

[Preparation of a catalyst]

Ten moles of anhydrous magnesium chloride was suspended in 50 liters of dehydrated and purfied hexane in a stream of nitrogen, and with stirring. 60 moles of ethanol was added dropwise over 1 hour. They were reacted at 75° C. for 1 hour. Then, 27 moles of diethyl aluminum chloride was added dropwise to the reaction mixture at room temperature, and the mixture was stirred for 1 hour. Subsequently, 100 moles of titanium tetrachloride was added, and the mixture was heated to 70° C. and reacted at this temperature for 3 hours with stirring. The resulting solid was repeatedly washed with hexane, and then suspended in butane. The resultant catalyst had an average particle diameter of 19 microns with a very narrow particle size distribution.

[Gas-phase Polymerization]

The catalyst suspended in butane and triethyl aluminum were continuously fed through line 1 into the first-step gas-phase polymerization vessel A having a diameter of 40 cm and a volume of 400 liters as shown in FIG. 1 at a rate of 1 mmoles/hr as Ti atom and 40 mmoles/hr, respectively. Simultaneously, ethylene was fed at a rate of 8 kg/hr through line 2, and hydrogen, through line 3 so that the H$_2$/ethylene mole ratio in the reactor was maintained at 5.

In the first-step polymerization vessel, the polymerization pressure was 18 kg/cm$^2$.G, the polymerization temperature was 85° C., the residence time was 2 hours, and the linear velocity of the circulating gas within the gas-phase polymerization vessel was maintained at 20 cm/sec. The circulating gas from line 4 passed through condenser D to condense butane. The gas was recycled to the polymerization vessel A through blower F. Polyethylene formed continuously under the above conditions had an MI of 440 and a density of 0.973 g/cm$^3$. The resulting polyethylene was continuously passed through line 6 and discharged into liquid butane in the drum C kept at a temperature of 30° C. and a pressure of 4 kg/cm$^2$.G. In the meantime, liquid butane was fed into the drum of C from line 10 so that the amount concentration of the polyethylene powder in the butane was 300 g/liter of butane. Hydrogen was discharged out of the system from line 8 by utilizing the gas-liquid equilibrium within the drum C. The polyethylene suspended in liquid butane in the drum C was fed continuously in the suspended state through line 9 to the second-step gas-phase polymerization vessel B by means of pump H. In the second-step polymerization vessel, the polymerization pressure was 10 kg/cm$^2$. G, the polymerization temperature was 80° C., the residence time was 1 hour, and the linear velocity of the circulating gas in the gas-phase polymerization vessel was maintained at 20 cm/sec. To the second-step polymerization vessel, ethylene was fed at a rate of 8 kg/hr from line 14, and hydrogen, from line 15 so that the H$_2$/ethylene mole ratio in the polymerization system was maintained at 0.2. Butane transferred from the drum C to the second-step gas-phase polymerization vessel was wholly gasified and used for removing part of the heat of polymerization. Butane discharged form the polymerization vessel together with the circulating gas from line 11 was cooled at the heat exchanger I, recovered as liquid butane at the drum J, and discharged through line 16. A part of the recovered liquid butane was fed to the drum C. The gas was recycled to the polymerization vessel B through line 12 by blower G.

From the second-step gas-phase polymerization vessel B, polyethylene was discharged out of the system continuously at a rate of 15.2 kg/hr through line 13.

The above procedure was repeated except that the gas-phase polymerization conditions were varied. For comparison, the gas-phase polymerization was continuously carried out in a single step using the catalyst used in Example 1. The results are shown in Table 1.

TABLE 1

| | First-step gas-phase polymerization conditions | | | | | Second-step gas-phase polymerization conditions | | | | | |
|---|---|---|---|---|---|---|---|---|---|---|---|
| | Temperature (°C.) | Pressure (kg/cm$^2$.G) | Time (hours) | H$_2$ to ethylene mole ratio | Co-monomer to ethylene mole ratio | Type of the co-monomer | Temperature (°C.) | Pressure (kg/cm$^2$.G) | Time (hours) | H$_2$ to ethylene mole ratio | Co-monomer to ethylene mole ratio | Type of co-monomer |
| Example 1 | 85 | 18 | 2 | 5.0 | 0 | — | 80 | 10 | 1 | 0.1 | — | — |
| Example 2 | 85 | 15 | 2 | 3.0 | 0 | — | 80 | 10 | 1 | 0.5 | — | — |
| Example 3 | 80 | 15 | 2 | 4.0 | 0 | — | 80 | 10 | 1 | 0.1 | 0.02 | butene |
| Example 4 | 80 | 10 | 2 | 1.5 | 0.04 | propylene | 80 | 10 | 1 | 0.2 | 0.04 | propylene |

Compara-

TABLE 1-continued

| | | | | | | | | | | | | |
|---|---|---|---|---|---|---|---|---|---|---|---|---|
| Comparative Example 1 | 85 | 15 | 3 | 2.0 | 0 | — | — | — | — | — | — | — |
| Comparative Example 2 | 80 | 15 | 2 | 0.5 | 0.02 | propylene | — | — | — | — | — | — |

| | Properties of the polymer | | | |
|---|---|---|---|---|
| | Bulk density (g/cm$^3$) | MI (g/10 min.) | Density (g/cm$^3$) | Molecular weight distribution (Mw/Mn) |
| Example 1 | 0.39 | 0.16 | 0.963 | 28.7 |
| Example 2 | 0.42 | 1.1 | 0.964 | 18.0 |
| Example 3 | 0.41 | 0.35 | 0.950 | 22.4 |
| Example 4 | 0.40 | 0.42 | 0.938 | 15.8 |
| Comparative Example 1 | 0.39 | 44 | 0.972 | 7.7 |
| Comparative Example 2 | 0.39 | 1.8 | 0.954 | 6.9 |

Example 5

By using the two-step gas-phase polymerization process shown in Example 1, low-density polyethylene having a very broad molecular weight distribution was produced by forming polyethylene having a low MI in a first-step gas-phase polymerization vessel, and polyethylene having a high MI in a second-step gas-phase polymerization vessel, as shown below.

[Preparation of a catalyst]

Anhydrous magnesium chloride (476 g), 1.5 liters of decane, 1.81 liters of 2-ethylhexyl alcohol, and 84 ml of ethyl benzoate were charged into a catalyst synthesizing device, and reacted at 130° C. for 3 hours. The reaction mixture was cooled to room temperature. The resulting solution was put in 20 liters of titanium tetrachloride maintained at −15° C., maintained at this temperature for 30 minutes, heated to 80° C. over 2 hours, and reacted at this temperature for 2 hours. The resulting solid portion was separated, and again suspended in 10 liters of titanium tetrachloride. Ethyl benzoate (223 ml) was added, and reacted at 90° C. for 2 hours. The resulting solid was separated by filtration, and repeatedly washed with hexane, and suspended in butane. The catalyst had an average particle diameter of 22 microns, and a very narrow particle size distribution.

[Gas-phase Polymerization]

The catalyst suspended in butane and triethyl aluminum were continuously fed into the first-step polymerization vessel at a rate of 1 mmole/hr calculated as Ti atom, and 40 mmole/hr respectively, and simultaneously, 9 kg/hr of ethylene and 4-methyl-1-pentene were fed so that the 4-methyl-1-pentene/ethylene mole ratio in the polymerization vessel was maintained at 0.06. The amount of H$_2$ fed was small so that the H$_2$/ethylene mole ratio in the polymerization vessel was maintained at 0.02.

In the first-step polymerization vessel, the polymerization pressure was 8 kg/cm$^2$. G, the polymerization temperature was 75° C., the residence time was 100 minutes, and the linear velocity of the circulating gas within the gas-phase polymerization vessel was maintained at 30 cm/sec. The condensed liquid containing butane and 4-methyl-1-pentene formed by the cooling of the circulating gas was partly fed in the liquid state into the polymerization vessel from the drum E to utilize it for removal of the heat of polymerization by its latent heat of evaporation.

From the first-step polymerization vessel, polyethylene having an MI of 0.007 and a density of 0.916 g/cm$^3$ was formed at a rate of 9.2 kg/hr. The polyethylene was continuously discharged into liquid butane kept at a pressure of 3.5 kg/cm$^2$.G and a temperature of 30° C. and suspended while feeding liquid butane so that the amount of polyethylene in the butane was 200 g/liter of butane. The polyethylene suspended in liquid butane in drum C was continuously fed in the suspended state to the second-step gas-phase polymerization vessel by means of pump H.

In the second-step gas-phase polymerization, the partial pressure of H$_2$ and the polymerization pressure were both higher than those in the first step. Specifically, the polymerization pressure was 14.6 kg/cm$^2$.G, the polymerization temperature was 80° C., the residence time was 50 minutes, and the linear velocity of the circulating gas in the gas-phase polymerization reactor was maintained at 20 cm/sec. Ethylene was fed at a rate of 8.8 kg/hr into the second-stage polymerization vessel, and 4-methyl-1-pentene was fed into it in such a proportion that the 4-methyl-1-pentene/ethylene mole ratio in the polymerization vessel was maintained at 0.14. H$_2$ was fed so that the H$_2$/ethylene mole ratio in the polymerization vessel was maintained at 1.1. Butane transferred from the re-slurry drum C to the second-step gas-phase polymerization vessel was wholly gasified by the heat of polymerization in the same way as in Example 1, and was utilized so as to remove a part of the heat of polymerization. Butane and 4-methyl-1-pentene discharged from the polymerization vessel together with the recycle gas, cooled at the heat exchanger I and recovered as a condensate at J were partly sent in the liquid state to the polymerization vessel where they were gasified for utilization in removing the heat of polymerization by its latent heat of evaporation.

From the second-step gas-phase polymerization vessel, low-density polyethylene having a very broad molecular weight distribution, an MI of 0.11, a density of 0.921 g/cm$^3$, a bulk density of 0.41 g/cm$^3$ and a Mw/Mn of 24.5 was continuously obtained at a rate of 18.5 kg/hr.

What we claim is:

1. In a process for polymerizing olefins in the gaseous phase in a first gas-phase polymerization zone and a second gas-phase polymerization zone, which are provided independently from each other, in the presence of a catalyst composed of a transition metal catalyst component and an organometallic compound of a metal of Groups I to III of the periodic table while feeding the catalyst-containing polymer formed in the first zone to the second zone; the improvement comprising (i) forming a suspension of the polymer from the first zone by feeding an easily volatile hydrocarbon medium, which is liquid under the conditions of feeding the polymer, to a suspension zone in the feed passage for feeding the polymer from the first zone to the second zone, and (ii) feeding the suspension of the polymer in said liquid medium formed in the suspension zone to the second zone.

2. The process of claim 1 wherein the multi-step gas-Phase polymerization is carried out in the presence of hydrogen in the first and second zones, and the hydrogen/olefin molar ratio in the second zone is maintained lower than that in the first zone.

3. The process of claim 1 wherein the easily-volatile hydrocarbon medium is a non-polymerizable hydrocarbon capable of being gasified in the second zone, an olefin, or a mixture of these.

4. The process of claim 3 wherein the non-polymerizable hydrocarbon is a non-polymerizable hydrocarbon having 3 to 5 carbon atoms.

5. The process of claim 1 wherein the suspension of polymer in the said liquid medium contains about 10 to about 1,000 g of the polymer per liter of said liquid medium.

6. The process of claim 1 wherein the multi-step gas-phase polymerization is carried out at a temperature of from room temperature to about 130° C. and a pressure of from atmospheric pressure to about 150 kg/cm². G.

7. The process of claim 1 wherein the suspension of the polymer in said liquid medium is formed at a temperature of 0° to about 100° C. and a pressure of from atmospheric pressure to about 50 kg/cm²G.

8. The process of claim 1 wherein the catalyst is composed of a highly active transition metal component capable of forming at least about 5000 g of an olefin polymer per millimole of the transition metal under the polymerization conditions in the first-step gas-phase polymerization zone, and an organoaluminum compound.

9. The process of claim 8 wherein the highly active transition metal compound is a component consisting essentially of titanium, magnesium and halogen.

10. The process of claim 1 wherein the multi-step gas-phase polymerization is carried out by using about 0.0005 to about 1 millimole as the transition metal of the transition metal catalyst component per liter of the fluidized bed in each gas-phase polymerization zone, and the amount of the organometallic compound is such that the atomic ratio of the metal of the organometallic compound to the transition metal is about 1 to about 2000.

* * * * *